W. E. JERAULD.
INDICATOR FOR ENGINES.
APPLICATION FILED DEC. 31, 1906.
908,867.
Patented Jan. 5, 1909.
2 SHEETS—SHEET 1.
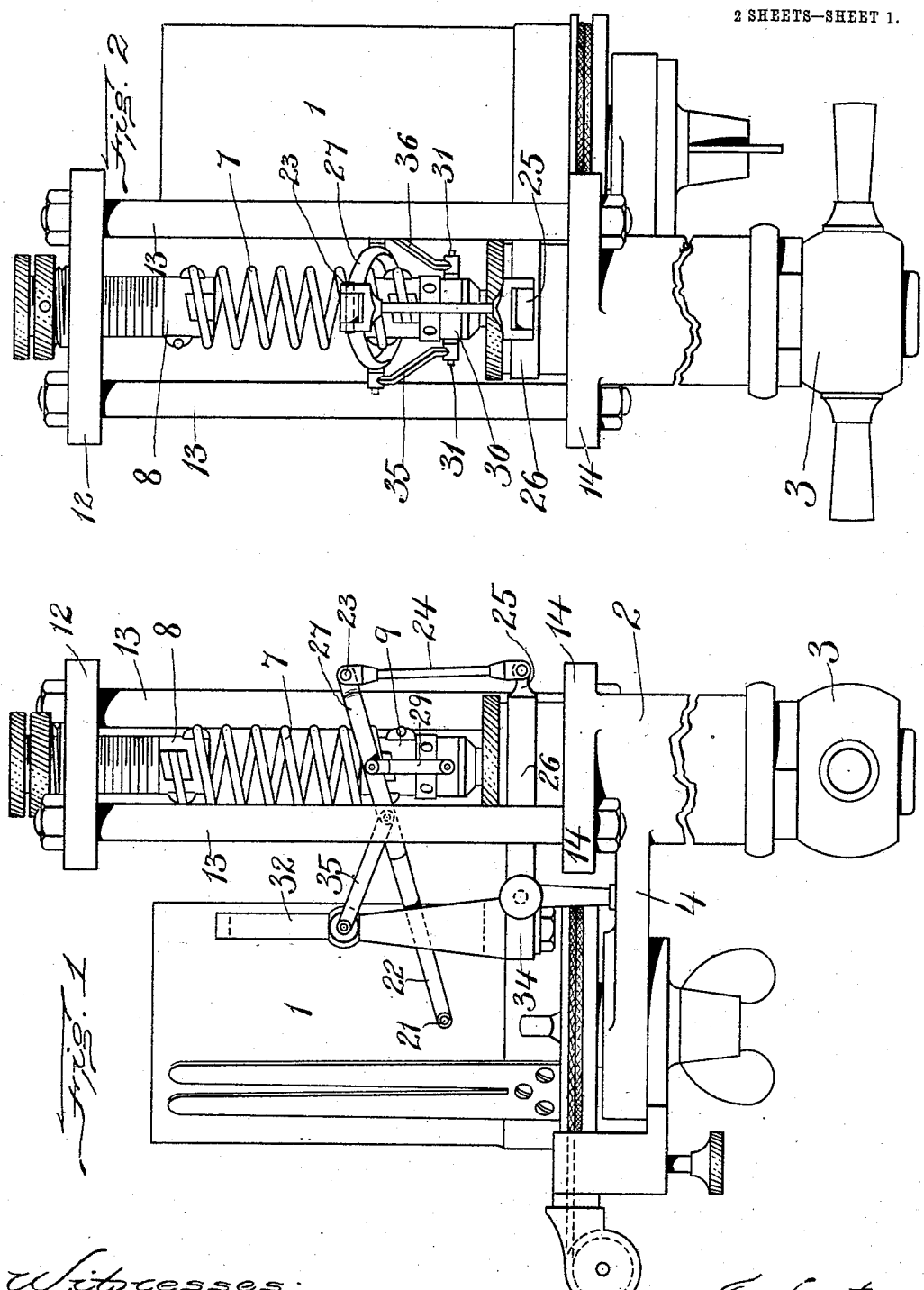
Witnesses:
Walter P. Ahell
A. C. Ratigan
Inventor
William E. Jerauld
by Wright Brown Quimby & May
Attorneys.

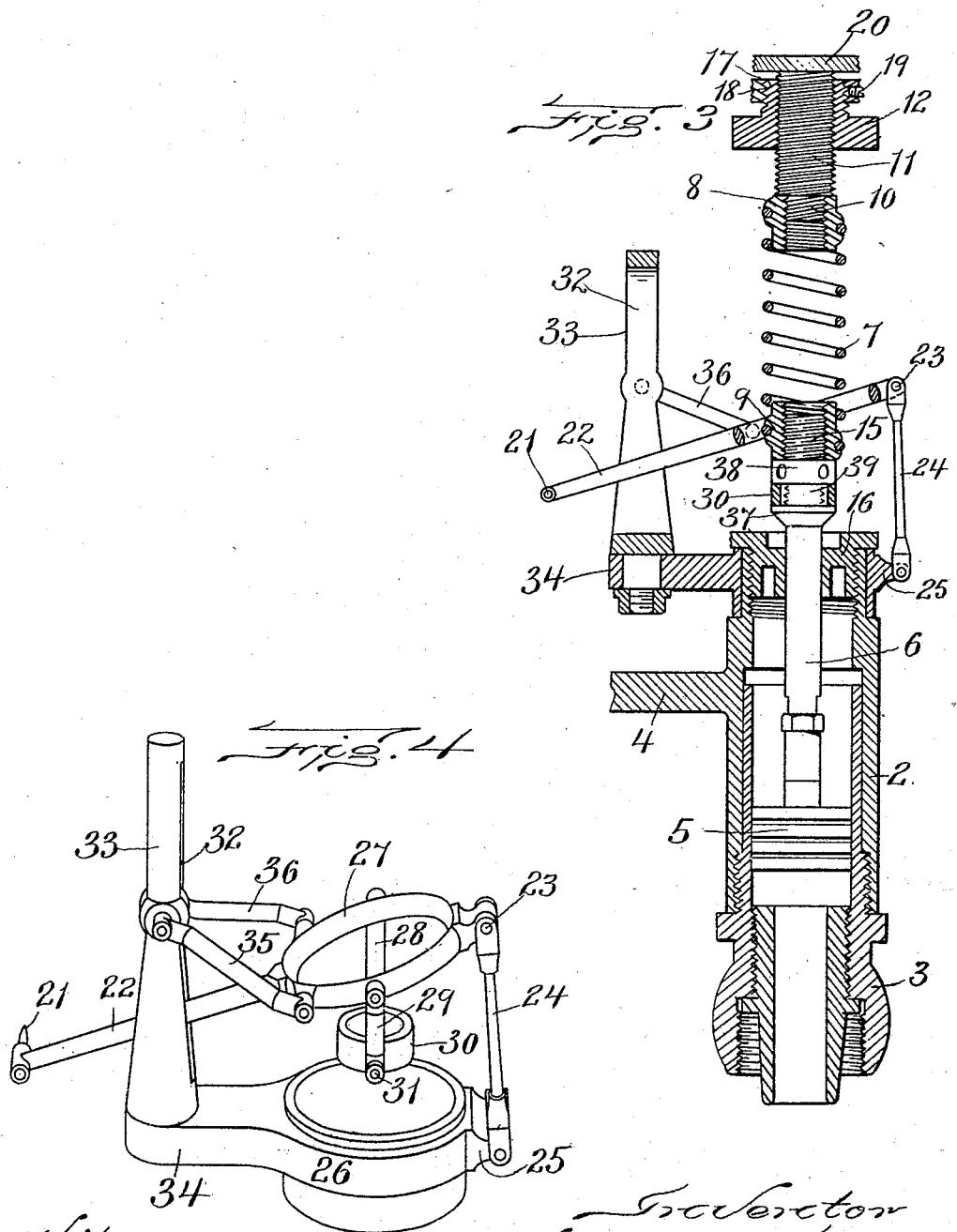

UNITED STATES PATENT OFFICE.

WILLIAM E. JERAULD, OF BOSTON, MASSACHUSETTS, ASSIGNOR TO AMERICAN STEAM GAUGE & VALVE MANUFACTURING COMPANY, OF BOSTON, MASSACHUSETTS, A CORPORATION OF NEW JERSEY.

INDICATOR FOR ENGINES.

No. 908,867.　　　　Specification of Letters Patent.　　　　Patented Jan. 5, 1909.

Application filed December 31, 1906.　Serial No. 350,116.

*To all whom it may concern:*

Be it known that I, WILLIAM E. JERAULD, of Boston, in the county of Suffolk and State of Massachusetts, have invented certain new and useful Improvements in Indicators for Engines, of which the following is a specification.

The present invention relates to indicators for determining the power of steam and other engines, and has particular reference to that class of indicators in which the spring is held outside of the pressure cylinder of the indicator.

The object of the invention is to provide certain improvements for this type of indicator by which the height of the pencil point may be adjusted to locate the position of the atmospheric line on the diagram, and by which the instrument may be rendered capable of securing more accurate results. These objects are attained by securing the spring externally to an adjustable abutment, by reducing the mass of the reciprocating parts to a minimum, and by so connecting the pencil-carrying mechanism with the piston as to cause the thrust of the latter to be exerted along the axial line of the motion of the piston and resistance of the spring.

Of the accompanying drawings,—Figure 1 represents a side elevation of an indicator embodying the principles of my invention. Fig. 2 represents an elevation as seen from the right of Fig. 1. Fig. 3 represents an axial section of the pressure-indicating parts of the indicator. Fig. 4 represents a perspective view of the pencil-actuating mechanism detached from the other parts of the apparatus.

The same reference characters indicate the same parts in all the figures.

Referring to the drawings, 1 represents the usual drum of the indicator upon which the card to receive the diagram is placed in the usual manner. 2 represents the pressure cylinder having a coupling nut 3 for securing it detachably to a pipe tapped into the cylinder of an engine, 4 represents an arm extending from the cylinder 2 and supporting the drum, 5 represents a piston reciprocating in the cylinder 2, and 6 is the piston-rod. These parts are all substantially the same as those used in indicators which are now in common use.

The novel features of my invention consist in the construction of the pencil-operating mechanism and the means for adjustably connecting the indicator spring. The latter is represented by 7 and is contained wholly outside of the cylinder 2 so that it is protected from the effects of the heat in the cylinder and is used under the same conditions in which it has previously been tested. The spring is secured at opposite ends to heads 8 and 9 which are threaded internally, and of which the former is screwed on to the reduced lower end 10 of a screw-abutment 11. The latter is threaded through a yoke 12 supported by posts 13 rising from lugs 14 on the sides of the cylinder. The lower head 9 of the spring is similarly screwed on a threaded stud 15 connected to the piston-rod 6 outside of the head 16 of the cylinder. Formed upon the yoke 12 and surrounding the abutment 11 is a nipple 17 threaded externally and surrounded by a threaded collar 18 which is adjustable thereon. The collar is adapted to be retained in any adjusted position by a set-screw 19, and when raised above the top of the nipple 17, acts as a stop engaged by the head 20 of the screw to limit the downward movement of the latter.

The marking point or pencil 21 is secured to the end of an arm 22 pivoted at 23 to a link 24 pivotally supported by a lug 25 on a collar 26 which is swivelly mounted upon the upper end of the cylinder 2, and is retained thereon by the head 16. The arm 22 is provided between its ends with an enlarged annular portion 27 which is adapted to surround the spring 7, and the opposite sides of which lie on opposite sides of the spring. The sides of this annular or bifurcated portion of the arm are connected by links 28 and 29 to a ring 30 by trunnions 31 on diametrically opposite points of the latter. The pencil-carrying end of the arm passes through a guiding slot 32 in a post 33 rising from an arm 34 which projects from the collar 26. Links 35 and 36 pivoted to the arm and the post guide the marking point 21 so that it travels in a straight line parallel with the axis of the drum. The ring 30 rotatably surrounds the end of the piston-rod 6, being supported by a flange 37 on the latter and held in place by a projecting collar or shoulder 38 on the stud 15. The latter has a projecting threaded end 39 detachably engaged with the end of the piston-rod.

The sides of the slot 32 embrace the arm 22 closely and guide the same when the pencil point is pressed against the paper on the drum, so that the latter is held firmly and without opportunity of springing. This causes a firm, well-defined mark to be made, and avoids inaccuracy. The links 28 and 29 on opposite sides of the piston-rod transfer the thrust of the latter to the pencil arm in a line which is the resultant of the forces carried through the two links, and which, therefore, coincides with the axis of the rod. Thus the thrust is direct and axial, preventing springing of the arm and insuring accuracy in the recording of pressures on the diagram.

It will be noted that the piston-rod terminates at the point where it is attached to the spring, and does not continue through the length of the spring as in other devices of this character, and it will also be noted that the marking arm and the connecting links are very light in construction. Thereby the sizes and weights of the reciprocating parts are reduced to the lowest possible terms, with a consequent reduction in the momentum acquired by their movement, and prevention of the recording on the diagram, by reason of such momentum, of greater differences between the extremes of pressure than actually exist. This removes or diminishes another source of considerable error.

In removing or applying a spring to the indicator, the screw abutment 11 must be rotated to connect or release the head 8 of the spring. This rotation consequently changes the position of the abutment relative to the yoke, but its correct location in order to position the atmospheric line, is always determined by screwing it down until its head bears against the stop collar 18. Thus when the latter is set in any particular adjusted position, the atmospheric line may be made at the same height on all the indicator cards, regardless of whether or not the spring has been removed or a different spring substituted between successive employments of the indicator.

I claim:—

1. In combination with the cylinder, piston, piston-rod, external spring and marker-operating mechanism of an indicator; a yoke external of the cylinder, an abutment threaded into said yoke detachably engaged with one end of the spring and adjustable to shift said spring and the marker, thereby altering the atmospheric line on the diagram, and an adjustable stop on the yoke adapted to be placed in different positions and to be engaged by the abutment to limit the adjustment of said abutment.

2. In combination with the cylinder, piston, piston-rod, external spring and marker-operating mechanism of an indicator; a yoke external of the cylinder having a nipple, an abutment having a head threaded through said yoke and nipple in the axial line of the cylinder and detachably engaged with one end of the spring, whereby the latter and the marker may be adjusted, and a stop threaded on the nipple adapted to be secured in adjusted position to limit the adjustment of said abutment.

3. In combination with the cylinder, piston, piston-rod, external spring and marker-operating mechanism of an indicator; a yoke external of the cylinder having a nipple, a screw abutment threaded through said yoke and nipple in line with the cylinder and detachably screwed into the head of the spring, and a collar threaded externally on said nipple and having a set-screw for locking it thereon; the collar limiting the movement of the abutment toward the cylinder and serving to locate the position of the marker.

4. In a steam-engine indicator, a cylinder, a piston therein, a piston-rod projecting through the cylinder head, a spring connected externally to the end of said rod, and a pencil-carrying arm bifurcated and extending on both sides of the spring and engaged with the rod on diametrically opposite sides thereof.

5. In a steam-engine indicator, a cylinder, a piston therein, a piston-rod projecting through the cylinder head, a spring connected externally to the end of said rod, a pencil-carrying arm having portions extending on opposite sides of the spring and a ring connected by links at diametrically opposite points thereon to said arm, said ring being freely rotatable on the rod.

6. In a steam-engine indicator, a cylinder, a piston therein, a piston-rod projecting through the cylinder head, a spring connected externally to the end of said rod, a pencil-carrying arm, a rigid abutment for the spring, the piston-rod terminating just without the cylinder head; a collar loosely mounted on the rod linked to the pencil arm for operating the same; and a stud screwed upon the rod, having a shoulder to retain the collar and threaded to mesh with a head on the spring.

7. In a steam-engine indicator, a cylinder, a piston therein, a piston-rod projecting through the cylinder head, a spring connected externally to the end of said rod, a pencil-carrying arm, a post having a slot, an arm passing through said slot adapted to carry a marking point and having a widened annular portion surrounding the spring, and connections on opposite sides of the spring between said arm and piston-rod for oscillating the arm.

In testimony whereof I have affixed my signature, in presence of two witnesses.

WILLIAM E. JERAULD

Witnesses:
C. F. BROWN,
A. C. RATIGAN.